US010752488B2

(12) United States Patent
Bey

(10) Patent No.: US 10,752,488 B2
(45) Date of Patent: Aug. 25, 2020

(54) SYSTEM AND METHOD FOR A MIXED-USE DISPENSING DEVICE WITH SEQUENTIAL TOGGLE OF THERMAL CUBICLES BASED ON A RECIPE FLOW LOGIC

(71) Applicant: Vicky Ware Bey, Wyandanch, NY (US)

(72) Inventor: Vicky Ware Bey, Wyandanch, NY (US)

( * ) Notice: Subject to any disclaimer, the term of this patent is extended or adjusted under 35 U.S.C. 154(b) by 91 days.

(21) Appl. No.: 15/669,723

(22) Filed: Aug. 4, 2017

(65) Prior Publication Data

US 2019/0039874 A1 Feb. 7, 2019

(51) Int. Cl.

| B67D 1/00 | (2006.01) |
|---|---|
| A47J 31/00 | (2006.01) |
| B67D 1/08 | (2006.01) |
| A47J 31/46 | (2006.01) |
| A47J 31/40 | (2006.01) |
| B67D 1/10 | (2006.01) |
| A47J 31/52 | (2006.01) |
| B67D 1/06 | (2006.01) |

(52) U.S. Cl.
CPC ............ *B67D 1/0888* (2013.01); *A47J 31/40* (2013.01); *A47J 31/402* (2013.01); *A47J 31/46* (2013.01); *A47J 31/52* (2013.01); *B67D 1/0035* (2013.01); *B67D 1/0046* (2013.01); *B67D 1/06* (2013.01); *B67D 1/0895* (2013.01); *B67D 1/108* (2013.01); *B67D 1/0869* (2013.01); *B67D 2210/00118* (2013.01); *B67D 2210/00128* (2013.01)

(58) Field of Classification Search
CPC ........ A47J 31/40; A47J 31/202; A47J 131/40; A47J 31/402; B67D 2210/00118; B67D 1/06; B67D 1/0895; B67D 1/108; B67D 1/0869; B67D 2210/00128
See application file for complete search history.

(56) References Cited

U.S. PATENT DOCUMENTS

| 2011/0088560 | A1* | 4/2011 | Nosler | ................. | A47J 31/007 |
| | | | | | 99/290 |
| 2012/0093996 | A1* | 4/2012 | Martin | ................. | B67D 1/0046 |
| | | | | | 426/589 |
| 2015/0034674 | A1* | 2/2015 | Hertensen | ............. | A47J 31/402 |
| | | | | | 222/129.1 |

* cited by examiner

*Primary Examiner* — Anshu Bhatia

(57) ABSTRACT

The present invention discloses a system and method for sequentially toggling a peristaltic pump disposed within a thermal cubicle for order-specific mixing of ingredients in a intermediary reservoir based on a recipe flow logic, the method comprising the steps of: receiving data input from a user via the user interface; based on the received input data, controlling at least one thermoelectric element disposed within an outer shell and inner conductive lining of at least one thermal cubicle to heat or cool said thermal cubicle; and based on the received input data, sequentially pumping a heated or cooled ingredient into the at least one tubular piping in fluid communication with any one of, or combination of, an intermediary reservoir for order-sensitive mixing of at least one other ingredient and, or directly to the pour outlet for dispensing.

15 Claims, 4 Drawing Sheets

SYSTEM AND METHOD FOR A MIXED-USE DISPENSING DEVICE WITH SEQUENTIAL TOGGLE OF THERMAL CUBICLES BASED ON A RECIPE FLOW LOGIC

RELATED U.S. APPLICATIONS DATA

This application claims priority under 35 U.S.C. 119(e) of provisional patent application No. 62/602,098 filed on Apr. 11, 2017, entitled "WARE BEVERAGE CUBE", which is hereby incorporated by reference in their entirety.

BACKGROUND

Field

The field of the invention relates to beverage or food dispensing systems and more particularly relates to a mixed-use counter-top dispensing device comprising an interface controlled system with programmable recipe logic for sequentially toggling of thermal cubicles in preparing and distilling any variety of beverages or food.

Related Art

Since time immemorial, beverages and food items have been prepared by hand—mixing ingredients according to tried and true recipes. However, over time, without any standardizations, the execution of said tried and true recipes may begin to go awry. It doesn't matter whether it's a simple recipe or a more exotic one, without a means for standardizing the execution of these recipes, there is a great likelihood of (1) being time inefficient; (2) wasting ingredients; and (3) lacking consistency of ingredients. Extant devices and the prior art do not disclose for a device that addresses all of the above-mentioned limitations by the automated and sequential toggling of thermal cubicles based on a recipe flow logic.

One such extant device is the Monsieur and Somabar—both an artificially-intelligent robotic bartender—self-aware, compact, and intuitive. They are both micro-processor controlled, remote server linked, and capable of suggesting drinks/recipes, however, they both lack an intelligent and sequential toggling of thermal cubicles based on a recipe flow logic. Unlike Bartendro, Monsieur and Somabar are self-contained, without the clutter of exposed pumps and tubing. Somabar and Monsieur both allow users to order drinks using the console display or smart phone app, and offers a wide variety of ancillaries- from peer-shared recipes; to tracking consumption; to receiving alerts and suggestions. They still both fall short of delivering standardized output due to a lack of sequential toggling of thermal cubicles and an intermediary reservoir, in fluid communication therefrom. As a result, Somabar and Monsieur's library of beverages are limited to drinks that do not require heating or cooling, and mixing with any other ingredient with a specific order. The end result are beverages that are not consistent in ingredients; not efficient; and a limited repertoire due to the lack of an interrelation between a heating element and cooling element—in a recipe logic driven manner.

U.S. Published patent application Ser. No. 14/025,808, entitled, "Systems and Methods for Automatic Mixed Drink Dispensing," assigned to Monsieur (inventors: Barry Given and Eric Williams), discloses a device with a memory and processor-connected to a remote server—that controls the actions of multiple pumps housed in a pump bank of the device, each connected to a respective container, and each dispensing fluid from its respective container according to a fluid flow logic. On the topside of the housing, a pump bank, with eight pumps, are each coupled to eight different containers, as the commercial embodiment discloses. The controller, which stores data regarding the specific fluid flow rate with respect to the particular drink selected and the determined cup size, activates the specific pump to dispense a calibrated amount from its corresponding container. The publication discloses a vastly different pump configuration, not to mention a drastically different beverage flow sequence. Givens and Monsieur do not disclose a single pump configuration within at least one thermal cubicle in fluid communication with a intermediary reservoir—and sequentially driven based on a recipe-driven logic that places emphasis on mixing order.

In Givens and Monsieur, based on the stored data in the controller, the first ingredient is pumped at a first speed and the second ingredient is simultaneously pumped at a second speed by another pump. The speed at which the fluids are pumped are determined by the stored data of ingredient proportions. For instance, if the drink calls for two parts A and one part B, then A will be pumped by pump A 2× faster than pump B in simultaneous fashion. This parallel pump configuration with simultaneous flow has tremendous drawbacks, not the least of which is the fact that a large pump bank is required, occupying the lion share of the housing. The other major drawback to the parallel pump and simultaneous fluid flow logic is that it is not conducive to proper food or beverage preparation. Certain recipes call for a specific ingredient to serve as a foundation or base and subsequent ingredients serving as an intermediary, activating, or finishing ingredient. This specific flow or dispensing sequence is critical for the integrity of the recipe and the ultimate dispensed food or beverage.

For the foregoing reasons, there is a need for a portable and counter-top factor device that employs a controller with stored data of beverage instruction that sequentially toggles draining of a thermal cubicle into an intermediary reservoir with a single pump configuration, such that beverages and food are prepared in their proper order. Additionally, the void of a large pump bank allows for a constrained form factor that may dedicate its remaining allowance of housing for integration of additional mixed-use kitchen appliances, such as a blender, juicer, brewer, etc.

SUMMARY

A method and system for the mixing and dispensing of any variety of food and beverages from a thermal cubicle coupled to a single, sequentially toggled pump and an intermediary reservoir controlled by an order-sensitive recipe logic is provided herein, that includes additional mixed-use counter-top appliances as one integrated assembly.

The present system is provided to solve the problems discussed above and other problems, and to provide advantages and aspects not previously provided. According to one embodiment, the dispensing system comprises a single pump configuration, in which a switchboard sequentially toggles draining of each thermal cubicle into an intermediary reservoir, whereby ingredients are mixed in their proper order, and finally dispensed through the outlet.

It is an object of the invention to disclose a system comprising: a cubic housing with a user interface; at least two thermal cubicles; at least one tubular piping; at least one pour outlet; a processor; a memory element coupled to the processor; encoded instructions; wherein the apparatus is further configured to: receive data input from a user via the user interface; based on the received input data, control at least one thermoelectric element disposed within an outer shell and inner conductive lining of at least one thermal cubicle to heat or cool said thermal cubicle; and based on the received input data, sequentially pump a heated or cooled ingredient into the at least one tubular piping in fluid communication with any one of, or combination of, an intermediary reservoir for order-sensitive mixing of at least one other ingredient and, or directly to the pour outlet for dispensing.

In one aspect, a processing unit which is configured to access the memory device and execute the instructions stored therein such that it is operable to receive one or more orders for a specific food item or beverage through the console interface or a mobile interface connected to a remote server; convert the order to initiate a series of steps for the execution of a mixed beverage; and enter each required step into a sequence corresponding to a different component of the system that is configured to perform that step, wherein the specific sequence represents an order in which the individual components will perform one or more steps in the specifically ordered sequence for one or more mixed food or beverages to be dispensed by the system.

In another aspect, the processor activates the switching system, which controls the check valve of a specific thermal cubicle peristaltic pump that should be activated and opened based on the food or beverage order requested. Each thermal cubicle drains into an intermediary reservoir by a single peristaltic pump, as opposed to a multiple, parallel pump configuration, pushing the fluid/ingredients up through the tubular pipes in recipe-order driven sequence.

In another aspect, the mixed-use dispensing device may be connected with a cloud server that allows it to interface with a mobile device app and to be integrated with a home automated system via WiFi, Bluetooth 4.0, ZigBee, or any other wireless access point. It is envisioned that the cloud-backed device will offer a full spectrum of cloud provisioning and analytics vis-à-vis an enhanced social experience—from user authentication; to recipe sharing; and to contextually-aware suggestions.

It is yet another object of the invention to disclose a method for sequentially toggling a peristaltic pump disposed within a thermal cubicle for order-specific mixing of ingredients in a intermediary reservoir based on a recipe flow logic, the method comprising the steps of: receiving data input from a user via the user interface; based on the received input data, controlling at least one thermoelectric element disposed within an outer shell and inner conductive lining of at least one thermal cubicle to heat or cool said thermal cubicle; and based on the received input data, sequentially pumping a heated or cooled ingredient into the at least one tubular piping in fluid communication with any one of, or combination of, an intermediary reservoir for order-sensitive mixing of at least one other ingredient and, or directly to the pour outlet for dispensing.

These and other features and improvements of the present application will become apparent to one of ordinary skill in the art upon review of the following detailed description when taken in conjunction with the several drawings and the appended claims.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments disclose systems and methods for allowing authorized users to dispense mixed beverages with a programmed micro-controller that directs sequential toggling of thermal cubicles, a single peristaltic pump, thermoelectric heat exchangers, valve assemblies, and an intermediary reservoir to deliver beverage preparation with the proper order of mixing. Additionally, the void of a clunk pump bank allows to reduce the form factor to fit on a counter-top, while still allowing for additional mixed-use appliances to fit within the housing for an integrated all-in-one kitchen device.

Figure 1:
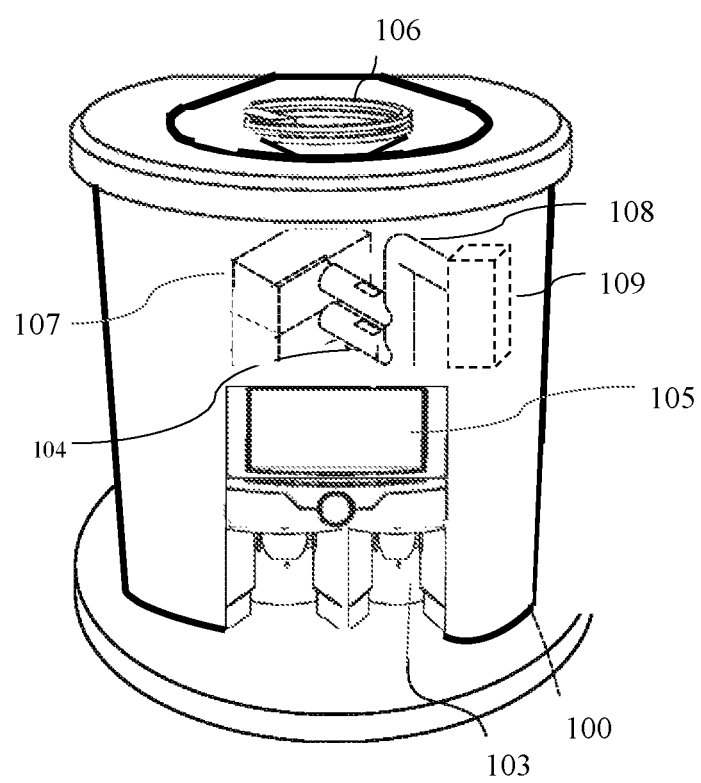
FIG. 1 is a front perspective view diagram of the housing unit according to an aspect of the invention.
Figure 2:
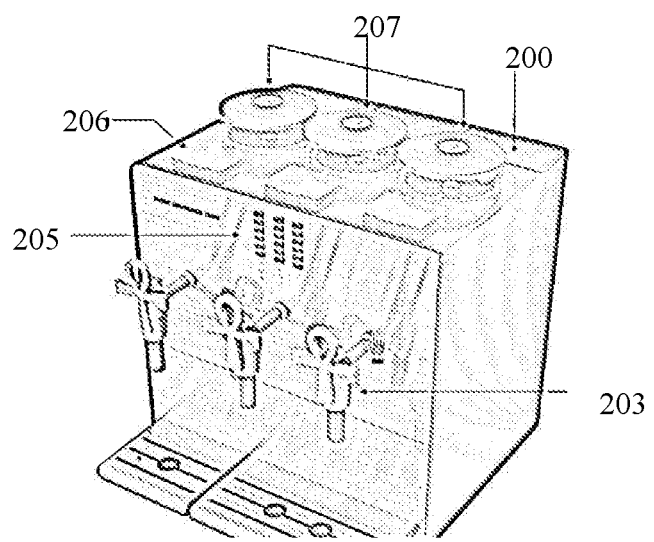
FIG. 2 is a front perspective view of an alternate housing unit with two outputs according to an aspect of the invention.

Now in reference to FIGS. 1 and 2, which show a front perspective view diagram illustrating a housing unit for the dispensing of mixed beverages/food preparation, in accordance with one embodiment of the present invention. The cubic housing or housing unit 100 may be a portable device, of any size housing unit 100, including larger units, with increased number of cubicles 107/outputs 103, appropriate for more service/industrialized applications, such as corporate, catering, event, restaurant, and bar service (FIG. 1). In other embodiments, the housing unit 200 may be smaller, with fewer number of cubicles 207 and outputs 203, more appropriate for conveniently being stowed away or featured on a counter-top for home-kitchen use (FIG. 2).

FIG. 1 is a front perspective view diagram illustrating an apparatus for the automated dispensing of sequentially mixed food and beverage preparation, in accordance with one consumer, counter-top embodiment of the present invention. FIG. 2 is a front perspective view diagram illustrating an apparatus for the automated dispensing of sequentially mixed food and beverage preparation, in accordance with a larger, commercial embodiment of the present invention. In the present example, the cubic housing or housing unit 100, 200 may be a console apparatus resting on a counter-top, configured to house at least two thermal cubicles 107. 207, but any number of thermal cubicles 107, 207 may be added, without departing from the scope of the invention. Likewise, the housing unit 100, 200 may have at least one tubular piping 208, intermediary reservoir 209, ducts, and, or shutters. Other embodiments may be portable devices for on-the-go individual use, or larger units, with increased number of system components or more industrial strength components, appropriate for group applications.

The preferred embodiment of the housing unit 100, 200 may have an integrated power output, motor output, dispensing output or pour outlet 103, 203, ingredient inputs 106, 206, controls, and interface display 105, 205. Housing unit 100 may encompass a housing top wall, bottom wall, and side walls that wrap around to meet the front wall and back wall. Front wall may have a dispensing output or pour outlet 103, 203 for dispensing of the sequentially mixed food and beverage preparation. Front wall may also have controls and a user interface display 105, 205 for mediating user interaction with dispensing device.

In other embodiments, though not shown in FIGS. 1 and 2, the housing unit 100, 200 may have flat side walls and flat or curved front and back walls. In yet other embodiments, the housing unit 100, 200 may have curved side walls that wrap around to meet curved or flat front and back walls. The front wall may have a dispensing output or pour outlet 103, 203 hidden behind a flush wall with the means of opening and closing. In some embodiments, the controls and interface display 105, 205 may be disposed on a top wall or side wall, as opposed to being disposed on a front wall. The ingredient inputs 106, 206 may be disposed on a front wall or side wall, as opposed to being disposed on a top wall.

In further detail, still referring to FIGS. 1 and 2, disclosed is a system comprising: a cubic housing 100, 200 with a user interface 105, 205; at least two thermal cubicles 107, 207; at least one tubular piping 208; at least one pour outlet 103, 203; a processor; a memory element coupled to the processor; encoded instructions; wherein the system is further configured to: receive data input from a user via the user interface 105, 205; based on the received input data, control at least one thermoelectric element disposed within an outer shell and inner conductive lining of at least one thermal cubicle 107, 207 to heat or cool said thermal cubicle 107, 207; and based on the received input data, sequentially pump a heated or cooled ingredient into the at least one tubular piping 208 in fluid communication with any one of, or combination of, an intermediary reservoir 209 for order-sensitive mixing of at least one other ingredient and, or directly to the pour outlet 103, 203 for dispensing.

The sequential toggling of draining cubicles 107, 207 into an intermediary reservoir 209 results in a proper mixing of beverages and food. Certain recipes call for a specific ingredient to serve as a foundation or base and subsequent ingredients serving as an intermediary, activating, or finishing ingredient. In conventional devices, the mixing is simultaneous by dual-action pumps; the first ingredient is pumped at a first speed and the second ingredient is simultaneously pumped at a second speed by another pump. The speed at which the fluids are pumped are determined by the stored data of ingredient proportions. For instance, if the drink calls for two parts A and one part B, then A will be pumped by pump A 2× faster than pump B in simultaneous fashion. This parallel pump configuration with simultaneous flow has tremendous drawbacks, not the least of which is the fact that a large pump bank is required, occupying the lion share of the housing. The other major drawback to the parallel pump and simultaneous fluid flow logic is that it is not conducive to proper food or beverage preparation.

In one embodiment, a processing unit which is configured to access the memory device and execute the instructions stored therein, is operable to receive one or more orders for a specific food item or beverage through the console interface or a mobile interface connected to a remote server; convert the order to initiate a series of steps for the execution of a mixed beverage; and enter each required step into a sequence corresponding to a different component of the system that is configured to perform that step, wherein the specific sequence represents an order in which the individual components will perform one or more steps in the specifically ordered sequence for one or more mixed food or beverages to be dispensed by the system.

In another embodiment, the processor activates the switching system, which controls the check valve of a specific thermal cubicle 107, 207 peristaltic pump 104 hat should be activated and opened based on the food or beverage order requested. Each thermal cubicle 107, 207 drains into an intermediary reservoir 209 by a single peristaltic pump 104, as opposed to a multiple, parallel pump configuration, pushing the fluid/ingredients up through the tubular pipes in recipe-order driven sequence.

The sequential pump configuration translating the recipe-order logic affords greater housing space due to the lack of a multi-pump bank. This increased housing space allows for additional compartments and componentry. The device may integrate additional components for an all-in-one counter-top kitchen-ware. The apparatus may be a self-cleaning multifaceted kitchen appliance that blends, juices, and grinds food products. The apparatus also brews and produces frozen beverages such as soft serve ice cream. The apparatus has the capacity to store hot, cold and frozen beverages at a constant temperature inside of its attached thermal cubicles, or in attached storage compartments. The apparatus has a water inlet system that provides water for self-sanitizing and for brewing tea, coffee and other beverages. The apparatus is a product that provides a solution to space and storage dilemmas faced by those who live in compact and small living quarters, and reduces energy consumption that results in the usage of multiple appliances.

In some embodiments, the refrigerated storage compartment cools and maintains cool temperatures of food products and beverages between 35°-40° Fahrenheit consistently inside of a room that's between 85°-95° degrees in Fahrenheit. The connecting tubal apparatus that is attached to this refrigerated container cools all beverages and food products within 3 seconds of passing through the cooling duct that is attached to the detachable refrigerated storage container. A tube extending from central region syphons food products from different areas in the apparatus that are programmed to be cooled through cooling duct that is attached to the cooling storage container allowing beverages or food products to instantaneously be cooled as it flows through the cooling duct into the detachable refrigerated storage compartment. This refrigerated storage compartment is powered by a shared standard voltage alternating current electrical power source that is located on the lateral portion of the apparatus. This refrigerated storage compartment is located in the rear portion of the apparatus that has a removable cover positioned at the top this portion of the container allowing users to pour liquids directly into the refrigerated container for cooling. This detachable storage container is self-cleaning, and lined with a non-stick internal lining for easy to cleaning. The cooling storage compartment operates with a Peltier effect thermoelectric element cooled by a "muffin" fan which operates from a shared voltage direct current for powering the thermoelectric element. The storage region is formed by a conductive metal inner liner that is insulated from the outer shell of the container. The liner is in contact with the cold side of the thermoelectric element; its temperature is automatically controlled to 35° F. nominal with the bottom-to-top temperature difference is held to within 2° F. by a thermally-designed tapered-thickness liner configuration.

In some embodiments, the heated storage compartment heats and maintains hot temperatures of food products and beverages at temperatures ranging from 120° Fahrenheit and 160° Fahrenheit consistently with a room temperature of 30°-20° Fahrenheit. Food products, liquids and beverages are instantaneously heated through an attached tubal apparatus that is attached to the heated storage compartment. This attached heating duct/tubal apparatus instantaneously heats all liquids and food products within 3 seconds of passing through this heating duct that is connected to the detachable heating storage compartment. This heated storage compartment utilizes heat that is transferred from the hot side of the thermoelectric unit by a finned heat sink using warm air through a set of air vents. A horizontal baffle plate surrounding the fan separates the incoming flow of external air from the exhaust flow of heated air. The heating storage compartment is powered by a shared voltage alternating current electrical power source that is located on the lateral portion of the apparatus. Both heating and cooling functions operate with a Peltier. This detachable storage container is self-cleaning, and lined with a non-stick internal lining for easy to cleaning.

In some embodiments, the depository storage compartment stores food refuge from juice creation. This refuge compartment is located in the rear of the Ware Beverage Cube. This product also contains a water reservoir for brewing and sanitizing.

With continuing reference to FIG. 1, a housing unit 100 may include a user interface display 105, wherein the user interface 105 may be integrated as a built-in console display. While in the present example, a built-in console display is shown, any type of user interface display 105 may be disclosed, including a mobile device display, a wearable device display, monitors, or any type of access device, without departing from the scope of the invention. In a preferred embodiment, the user interface display 105 may include a display page for receiving a request for a food/beverage selection. The request being from a menu, a food/beverage suggestion engine, or user-initiated. The display page may then prompt a user to confirm the request. Other embodiments may include a display page that does not require a user to confirm the request, and instead, signals confirmation of the request and initialization.

In yet another embodiment, the user interface display 105 may include a voice-activated request option receiving a request voice command, whereby the request voice command may be in communication with a voice-activated module querying at least one pre-defined food/beverage database based on the request voice command. The voice-activated module may be in communication with a natural language module, whereby the request voice command is sent from the voice-activated module to the natural language module. The natural language module may be configured to convert the request voice command into a food/beverage instruction, and the instruction instructing the voice activated module to query at least one pre-defined database of food/beverages based on the request voice command.

In other embodiments, the voice activated interface may comprise a voice-activated request option receiving a first request voice command, whereby the said request voice command is in communication with a voice-activated module querying at least one pre-defined database of food/beverages based on the first request voice command. The voice-activated module may be in communication with a semantic and syntactic natural language module, whereby the first food/beverage request voice command is sent from the voice-activated module to the natural language module; and the natural language module configured to convert the first request voice command into at least one of a food, beverage, and, or frozen beverage selection dispensing instruction, said instruction instructing the voice activated module to query at least one pre-defined database of food/beverage based on the first request voice command.

In some embodiments, the voice command requests may accommodate for at least one of a food, beverage, and, or frozen beverage selection and interacts with user via voice response. The voice response may comprise the voice activated module in communication with the natural language module, the voice activated module in communication with a voice response module, whereby the voice response module alerts user of the various stages of at least one of a food, beverage, and, or frozen beverage dispensing via the voice-activated user interface using natural language.

The voice response may describe at least one of the following functions: an identification of a user; at least one of food, beverage, and, or frozen beverage inquiry or request or suggestion; confirmation of at least one of food, beverage, and, or frozen beverage selection; progress of matching at least one of food, beverage, and, or frozen beverage selection against a pre-defined database; order in queue; progress of preparation; and completion of beverage dispense.

While not shown in FIGS. 1 and 2, some embodiments may include the addition of a remote server to provide for back-end functionality and support. The server may be situated adjacent or remotely from the system and connected to each system via a communication network. In one embodiment, the server may be used to support verification or authentication of a user and a mobile device application function. In authenticating a user, a server may be further caused to recognize the mixed beverage dispensing device housing a unique short-range communication tag. The server may identify and authenticate the particular component and user device by recognizing the unique tag, and then, authenticate the user by identifying the user device located at the particular dispensing device. The unique, short-range tag may be a NFC tag, RFID chip, bluetooth, ZigBee, or any short-range communication protocol standard. The remote server may be further configured to support a food/beverage order history function; help support a network sharing function; and support a food/beverage selection search engine. The remote server may be further configured to provide a user-control system, which authenticates the user and retrieves usage data of the user and applies the data against a predefined criteria of use.

Other embodiments may include a remote server that is configured to provide a contextually-aware food/drink suggestion engine, which may access the user food/drink history function and at least one user contextual information to cause the processor to display a suggested food/drink selection on at least one display interface 105. Provisioning of the remote server may be delivered as a cloud service. In yet other embodiments, a mixed food/beverage device may be associated with an Internet of Things, whereby the device is fully integrated into a users home automation system, thereby providing additional contextual information for a contextually-aware drink suggestion engine.

Figure 3:
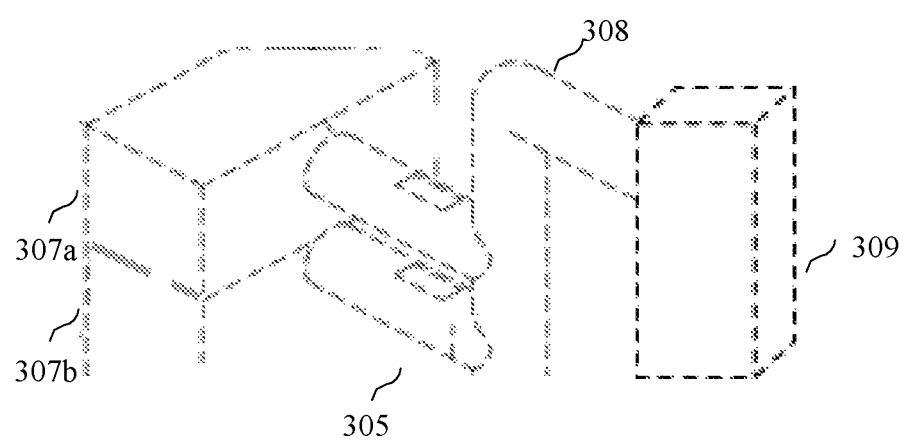
FIG. 3 is a block diagram of the system configuration according to an aspect of the invention.

FIG. 3 is a block diagram of the system configuration according to an aspect of the invention. The sequential toggling of draining cubicles 307 into an intermediary reservoir 309 results in a proper mixing of beverages and food. Certain recipes call for a specific ingredient to serve as a foundation or base and subsequent ingredients serving as an intermediary, activating, or finishing ingredient. In conventional devices, the mixing is simultaneous by dual-action pumps; the first ingredient is pumped at a first speed and the second ingredient is simultaneously pumped at a second speed by another pump. The speed at which the fluids are pumped are determined by the stored data of ingredient proportions. This parallel pump configuration with simultaneous flow has tremendous drawbacks, not the least of which is the fact that a large pump bank is required, occupying the lion share of the housing. The other major drawback to the parallel pump and simultaneous fluid flow logic is that it is not conducive to proper food or beverage preparation.

In one embodiment, a processing unit which is configured to access the memory device and execute the instructions stored therein, is operable to receive one or more orders for a specific food item or beverage through the console interface or a mobile interface connected to a remote server; convert the order to initiate a series of steps for the execution of a mixed beverage; and enter each required step into a sequence corresponding to a different component of the system that is configured to perform that step, wherein the specific sequence represents an order in which the individual components will perform one or more steps in the specifically ordered sequence for one or more mixed food or beverages to be dispensed by the system.

For instance, thermal cubicle 307 a may be activated first to pump the ingredient A first into the intermediary reservoir 309, followed by thermal cubicle 307 b being activated and pumping ingredient B into the same intermediary reservoir 309. As a result, intermediary reservoir 309 may have a combination of ingredient A and B, with ingredient A serving as the underlying substrate for the A-B mix. Conversely, if the A-B mix calls for ingredient B serving as the underlying substrate, then thermal cubicle 307b will be activated first to pump into the intermediary reservoir 309.

In another embodiment, the processor activates the switching system, which controls the check valve of a specific thermal cubicle 307 peristaltic pump 305 that should be activated and opened based on the food or beverage order requested. Each thermal cubicle 307 drains into an intermediary reservoir 309 by a single peristaltic pump, as opposed to a multiple, parallel pump configuration, pushing the fluid/ingredients up through the tubular pipes 308 in recipe-order driven sequence. In a preferred embodiment, a single pump configuration, whereby a single peristaltic pump 305 sequentially displaces the contents of at least one ingredient from a thermal cubicle 307 to an intermediary reservoir 309 based on an order-specific recipe logic.

The order recipe logic may be pre-defined and, or programmed by the user. The order recipe logic may predict or suggest thermal cubicle 307 activation based on similarity with other recipes, or specific ingredients. For example, if a requested item is not pre-defined or programmed by the user, but yet requested, then the processor may be configured to reference against a library of recipes; match the requested item against similar items in the library based on similarity of ingredients; and parse the matched item for thermal cubicle 307 activation sequence and infer a sequence for the requested item.

In a preferred embodiment, user input may command a micro-controller for serial activation of thermal cubicles 307 a, b according to a stored order recipe logic. Alternatively, user input may command a micro-controller for parallel activation of thermal cubicles 307 a, b according to a stored order recipe logic. User input may include manually inputted information from a console device user interface display, or remotely from a user mobile device. User input information may include manually inputted information, stored user profile information, or server-backed user contextual information. The micro-controller may be a Raspberry Pi, Arduinos, PIC, or any micr-controller with extensive processing power and a small-scale form factor. Communication between interface to micro-controller, and micro-controller to actuation of thermal cubicles 307, peristaltic pump 305, tubular piping 308, intermediary reservoir 309, and output 303, may be by any of the known methods of short-range or long-range wireless connections, such as WAN, LAN, WiFi, UWB, Bluetooth, ZigBee, PWM, or any protocol standards for wireless communications with low power consumption.

Sequential toggling of thermal cubicles 307 for activation of heating elements or draining via a peristaltic pump 305 is mediated by a micro-controller encoding stored recipe logic, which also includes fluid levels, fluid flow rates, and other dispensing properties. In one embodiment, a lift gear may engage with a rack on the back wall of the plunger, serving as a check valve, allowing for fluids to enter or exit the thermal cubicle 307. In another embodiment, a lift gear may engage with a rack on the back wall of the plunger, gating fluids entering the thermal cubicle 307. In yet another embodiment, the heated fluids (by a peltier plate) or cooled fluids (condenser) may be pumped up by the suction force of a peristaltic pump 305.

In a preferred embodiment, the thermal cubicle 307 may then drain its entire contents into a peristaltic pump 305, which pushes the fluid ingredients into an intermediary reservoir 309; through a tubular piping 308; and dispensing out through an output 303. In another embodiment, fluid ingredients from a thermal cubicle, irrespective of ingredients or recipe flow logic, may all drain into a central reservoir 309 simultaneously or order-agnostic, whereby a peristaltic pump may pump the ingredients simultaneously.

While not illustrated in FIG. 3, the thermal cubicles 307 may be lined with thermoelectric plates or peltier plates that may may be embedded within the walls of the thermal cubicles, ensuring an earlier onset of temperature treatment of the beverage ingredients. In some embodiments, the thermoelectric plate or peltier plate may be disposed on a surface of any one of a wall of the thermal cubicle 307. In an exemplary embodiment, the thermoelectric plate or peltier plate may be embedded within a bottom wall of the thermal cubicle 307.

Figure 4:
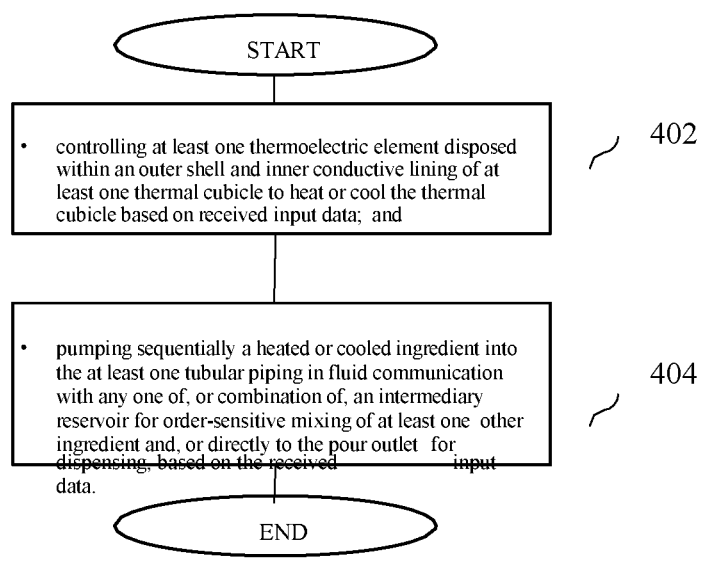
FIG. 4 is a method flow diagram according to an aspect of the invention.

FIG. 4 illustrates a method flow diagram. Step 1 402 describes controlling at least one thermoelectric element disposed within an outer shell and inner conductive lining of at least one thermal cubicle to heat or cool the thermal cubicle based on received input data; and step 2 404 describes pumping sequentially sequentially a heated or cooled ingredient into the at least one tubular piping in fluid communication with any one of, or combination of, an intermediary reservoir for order-sensitive mixing of at least one other ingredient and, or directly to the pour outlet for dispensing, based on the received input data.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with variations from the illustrations. Thus, embodiments of the invention should not be construed as limited to the particular shapes of regions illustrated herein but are to include deviations in shape and form. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entirety.

In the following description, for purposes of explanation, numerous specific details are set forth in order to provide a thorough understanding of the invention. It will be apparent, however, to one skilled in the art that the invention can be practiced without some specific details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Although a few exemplary embodiments of the present disclosure have been shown and described, the present disclosure is not limited to the described exemplary embodiments. Instead, it would be appreciated by those skilled in the art that changes may be made to these exemplary embodiments without departing from the principles and spirit of the present disclosure, the scope of which is defined by the claims and their equivalents.

It will be understood that when a layer is referred to as being "disposed on top of" another layer, it can be directly on the other layer or intervening layers may also be present. In contrast, when a layer is referred to as "communicating with" another layer, there are no intervening layers present. Similarly, it will be understood that when a layer is referred to as being "below" another layer, it can be directly under the other layer or intervening layers may also be present.

It will also be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer, without departing from the scope of the present invention.

I claim:

1. A multi-function kitchen-ware system comprising:
   a cubic housing;
   a user interface disposed on a surface of the cubic housing;
   at least two thermal cubicles with at least one pump in each of said cubicles;
   a cubicle valve;
   at least one tubular piping;
   an intermediary reservoir;
   at least one pour outlet;
   a controller;
   a processor;
   a memory element coupled to the processor;
   encoded instructions;
   wherein the system is further configured to:
      receive a data input from a user via the user interface;
      based on the received data input, control at least one thermoelectric element disposed within the at least one thermal cubicle to heat or cool said thermal cubicle;
      based on the received data input, the controller controls for at least one of a serial toggling of the cubicle draining based on at least one of recipe or fluid flow characteristics associated with the recipe, whereby a longest flowing cubicle valve is opened first, then switching open at least one other shorter flowing cubicle valve, before switching closed the longest flowing cubicle valve, or different pump rates of the pumps for each of the cubicles based on at least one of recipe or fluid flow characteristics associated with the recipe; and
      based on at least one of the toggling or pumping operational flow, simultaneously complete draining or pumping of contents from each of the cubicles for even mixing of contents from each of the cubicles.

2. The system of claim 1, wherein the user interface comprises at least one of a built-in cubic housing display, mobile device display, wearable device display, monitors, or access devices.

3. The system of claim 1, wherein the user interface comprises:
   an input for receiving a request to create at least one of a food, beverage, and, or frozen beverage selection, said request being from a pre-selected menu, a suggestion engine, or user- initiated; and
   a signal to a user of one or more communications, said communications describing at least one of the following functions:
      prompting user for a food, beverage, and, or frozen beverage selection request;

querying at least one pre-defined database using said request;

notifying user of mixing and, or dispensing in progress; and notifying user of completion of dispensing.

4. The system of claim 1, wherein the user interface authenticates a user by an authentication module detecting a short-range tag coupled to a user device.

5. The system of claim 1, wherein the thermal cubicles are detachable.

6. The system of claim 1, wherein the thermal cubicles are embedded and/or disposed with a thermoelectric element.

7. The system of claim 1, wherein the thermal cubicle are embedded and/or disposed with a cooling element.

8. The system of claim 1, further comprising a single pump configuration, whereby a single peristaltic pump sequentially displaces contents of at least one ingredient from a first thermal cubicle and then from at least a second thermal cubicle into an intermediary reservoir based on an order-specific recipe logic.

9. The system of claim 1, wherein the tubular piping couples at least one of the thermal cubicle and intermediary reservoir, thermal cubicle and pour outlet, or intermediary reservoir and pour outlet.

10. The system of claim 1, further comprising a remote server, wherein the remote server is in communication with a beverage dispensing device and comprises:

a memory; and a processor, wherein the processor comprises any one of the following:

a user authentication system;

a drink order history function; and a contextually-aware drink suggestion engine, wherein the contextually-aware drink suggestion engine accesses the drink order history function and at least one contextual information to cause the processor to display a suggested drink on at least one display interface.

11. The system of claim 1, further comprising a self-cleaning irrigation system, whereby inner walls and tubing are flushed with at least one of a high-pressure, heated, or sterilized solution.

12. The system of claim 1, further comprising a power circuit coupled to at least one of a interface display, console device, thermal cubicle, peristaltic pump, tubular piping, intermediary reservoir, or output.

13. The system of claim 1, further comprising at least two distinct kitchen-ware functionality in a counter-top console, wherein the kitchen-ware functionality may be any of a hot brew, cold juice, and, or blend.

14. A multi-functional kitchen-ware apparatus comprising:

at least two cubicles;

at least one tubular piping;

at least one pour outlet;

at least one pump and valve for each of said cubicles;

a controller;

a cubic housing with a user interface to receive data input from a user via the user interface; and based on the received data input, control for at least one of a serial toggling of the cubicle draining by the controller based on at least one of recipe or fluid flow characteristics associated with the recipe, whereby a longest flowing cubicle valve is opened first, then switching open at least one other shorter flowing cubicle valve, before switching closed the longest flowing cubicle valve, or different pump rates of the pumps for each of the cubicles based on at least one of recipe or fluid flow characteristics associated with the recipe; and based on at least one of the toggling or pumping operational flow, simultaneously complete draining or pumping of contents from each of the cubicles for even mixing of contents from each of the cubicles.

15. The apparatus of claim 14, further comprising at least two distinct kitchen-ware functionality in a counter-top console, wherein the kitchen-ware functionality may be any of a hot brew, cold juice, and, or blend.

* * * * *